(12) United States Patent
Klima et al.

(10) Patent No.: US 11,053,840 B2
(45) Date of Patent: Jul. 6, 2021

(54) INTERNAL COMBUSTION ENGINE, TURBOCHARGER FOR AN INTERNAL COMBUSTION ENGINE AND METHOD FOR OPERATING THE INTERNAL COMBUSTION ENGINE

(71) Applicant: MAN Energy Solutions SE, Augsburg (DE)

(72) Inventors: Jirí Klima, Namest nad Oslavou (CZ); Cyril Drápela, Velké Meziříčí (CZ); Martin Vacek, Brno (CZ)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/128,631

(22) Filed: Sep. 12, 2018

(65) Prior Publication Data
US 2019/0078503 A1 Mar. 14, 2019

(30) Foreign Application Priority Data
Sep. 14, 2017 (DE) .................. 10 2017 121 322.8

(51) Int. Cl.
| | | |
|---|---|---|
| F02B 37/007 | (2006.01) | |
| F02M 21/02 | (2006.01) | |
| F02B 37/013 | (2006.01) | |
| F02B 37/00 | (2006.01) | |
| F02B 43/02 | (2006.01) | |
| F02C 6/12 | (2006.01) | |

(52) U.S. Cl.
CPC .......... *F02B 37/007* (2013.01); *F02B 37/001* (2013.01); *F02B 37/013* (2013.01); *F02B 43/02* (2013.01); *F02C 6/12* (2013.01); *F02M 21/0245* (2013.01); *F05D 2220/40* (2013.01)

(58) Field of Classification Search
CPC ............... F02B 37/007; F02B 37/00; F02B 37/001–013; F02B 37/025; F02B 39/005; F02B 11/00; F02B 11/02; F02B 9/02; F02B 1/12; F02B 7/00; F02B 7/06; F02B 7/08; F02B 13/02; F02B 3/06; F02B 43/00–12; F02B 49/00; F02B 2201/04; F02B 2201/06; F02B 2201/064; F02B 2201/066; F02C 6/12; F05D 2220/40; F02M 21/00; F02M 21/02; F02M 21/0218; F02M 21/023; F02M 39/00; F02M 39/005; F02M 39/02; F02M 43/02; F02M 49/00; F02M 49/02; F02M 57/022; F02M 57/023
USPC .... 60/598, 605.1, 609, 612; 123/528, 559.1, 123/562, 565
See application file for complete search history.

(56) References Cited

U.S. PATENT DOCUMENTS

| | | | | |
|---|---|---|---|---|
| 6,374,612 | B1 * | 4/2002 | Gladden | ............. F02B 29/0412 123/559.1 |
| 2016/0319744 | A1 * | 11/2016 | Deng | ........................ F02C 7/06 |
| 2017/0248032 | A1 * | 8/2017 | Williams | ................ F02B 37/00 |

FOREIGN PATENT DOCUMENTS

JP 2006241979 A * 9/2006

* cited by examiner

*Primary Examiner* — Mark A Laurenzi
*Assistant Examiner* — Mickey H France
(74) *Attorney, Agent, or Firm* — Cozen O'Connor

(57) ABSTRACT

An internal combustion engine, in particular gas engine, with multiple cylinders, wherein in the cylinders a mixture of charge air and a gaseous fuel can be combusted, with a first turbocharger, in which exclusively the charge air can be compressed, and with a second turbocharger, in which exclusively the gaseous fuel can be compressed.

6 Claims, 1 Drawing Sheet

INTERNAL COMBUSTION ENGINE, TURBOCHARGER FOR AN INTERNAL COMBUSTION ENGINE AND METHOD FOR OPERATING THE INTERNAL COMBUSTION ENGINE

FIELD OF THE INVENTION

The present invention relates to an internal combustion engine, a turbocharger for an internal combustion engine and to a method for operating the internal combustion engine.

BACKGROUND OF THE INVENTION

An internal combustion engine designed as gas engine or dual-fuel engine comprises multiple cylinders, wherein in the cylinders a mixture of charge air and a gaseous fuel is combusted. In gas engines or dual-fuel engines known from practice, the mixture of charge air and the gaseous fuel is mixed upstream of the cylinders of the internal combustion engine and jointly compressed via an exhaust gas turbocharger. Accordingly, a common turbocharger is present for compressing the charge air and the gaseous fuel.

Accordingly, an object of the present invention is to provide a new type of internal combustion engine, a turbocharger for such an internal combustion engine and a method for operating such an internal combustion engine.

SUMMARY OF THE INVENTION

The internal combustion engine according to the present invention comprises a first turbocharger in which exclusively the charge air can be compressed.

The internal combustion engine according to the invention furthermore comprises a second turbocharger, in which exclusively the gaseous fuel can be compressed.

In the internal combustion engine according to the invention, the charge air is compressed in the first turbocharger and independently thereof the gaseous fuel in the second turbocharger. Because of this it is possible to compress charge air and gaseous fuel to individual pressures and carry out the mixing of charge air and gaseous fuel in the region of a cylinder head of the internal combustion engine.

According to an advantageous further development, the first turbocharger comprises a single compressor stage, wherein the second turbocharger comprises at least two compressor stages. Because of this it is possible in a particularly advantageous manner to compress the gaseous fuel to a higher pressure than the charge air.

The turbocharger of such an internal combustion engine according to the invention, which exclusively serves for compressing the gaseous fuel comprises a first compressor stage and compressor with a first compressor rotor and a second compressor stage and a second compressor rotor. Such a turbocharger is of a particularly compact design. The same serves for compressing the gaseous fuel independently of the compressing of the charge air.

According to an advantageous further development, a curved flow passage with a first passage section leading away from the first compressor stage in the radial direction, a second passage section leading to the second compressor stage in the radial direction and a third curved passage section running between these runs between the compressor stages of the compressor, wherein in the second passage section leading towards the second compressor stage in the radial direction, guide blades are arranged. Due to the guide blades, gaseous fuel that has been precompressed in the first compressor stage can be advantageously fed to the second compressor stage for further compression.

According to an advantageous further development, cooling channels are introduced into the housing of the compressor, via which the compressor stages of the compressor can be cooled. Preferentially, further cooling channels are introduced into a bearing housing. The cooling of the compressor and thus the cooling of the gaseous fuel compressed by the compressor allows a particularly advantageous operation of the internal combustion engine.

The method for operating an internal combustion engine according to the invention is characterized in that through the second turbocharger the gaseous fuel can be compressed to a higher pressure than the charge air by the first turbocharger. Because of the fact that the gaseous fuel is compressed to a higher pressure than the charge air independently of the charge air, an advantageous operation of the internal combustion engine is possible. Advantageously, the compressed charge air and the independently compressed gaseous fuel are mixed in a cylinder head or before the cylinder head.

BRIEF DESCRIPTION OF THE DRAWINGS

Exemplary embodiments of the invention are explained in more detail by way of the drawing in which.

DETAILED DESCRIPTION OF THE PRESENTLY PREFERRED EMBODIMENTS

The present invention relates to an internal combustion engine designed as gas engine or dual-fuel engine, to a turbocharger for such an internal combustion engine and to a method for operating such an internal combustion engine.

Figure 1:
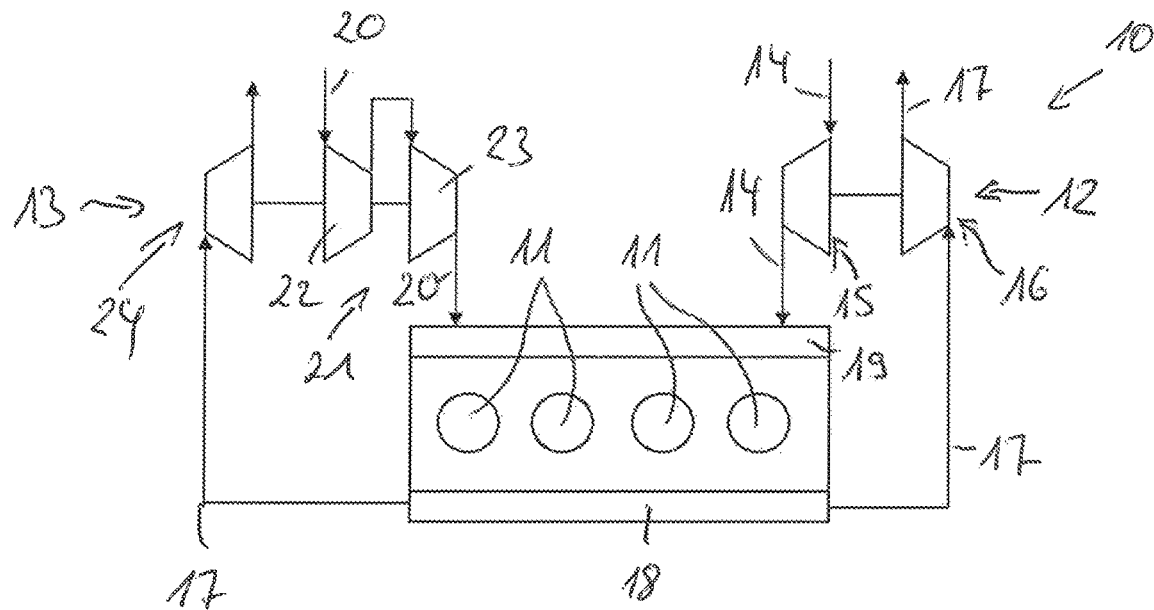
FIG. 1 is a schematic block diagram of an internal combustion engine designed as gas engine.

FIG. 1 shows highly schematically a block diagram of a gas engine 10 according to the invention. The gas engine 10 comprises multiple cylinders 11 in which a mixture of charge air and a gaseous fuel is combusted.

The gas engine 10 comprises multiple turbochargers 12, 13.

A first turbocharger 12 exclusively serves for compressing charge air 14. For this purpose, the first turbocharger 12 comprises a compressor 15 for compressing the charge air and a turbine 16 for expanding exhaust gas 17 leaving the internal combustion engine. Exhaust gas 17 is extracted from an exhaust gas manifold 18 and fed to the turbine 16 of the first turbocharger 12 in order to be expanded in the turbine 16 of the first turbocharger 12, wherein energy extracted here is utilized in order to compress the charge air 14 in the compressor 15 of the turbocharger 12 and to feed the same to a cylinder head 19.

While the first turbocharger 12 exclusively serves for compressing charge air, the second turbocharger 13 exclusively serves for compressing gaseous fuel 20. For this purpose, the second turbocharger 13 comprises a compressor 21 with multiple compressor stages 22, 23. In the shown exemplary embodiment, the compressor 21 of the second turbocharger 13 comprises two compressor stages 22, 23 for compressing the gaseous fuel 20, which as compressed gaseous fuel 20 can be likewise fed to the cylinder head 19 in order to mix the compressed charge air 14 and the compressed gaseous fuel 20 in the region of the cylinder head 19.

The second turbocharger 13 comprises a turbine 24 in which exhaust gas 17 of the cylinders 11 can likewise be expanded in order to extract energy in the process and, utilizing the energy extracted in the turbine 24 of the second turbocharger 13 during the expansion of the exhaust gas 17, drive the two compressor stages 22, 23 of the compressor 21 for compressing the gaseous fuel 20.

Accordingly, the gas engine 10 according to the invention comprises turbochargers 12, 13, in which, independently of one another, charge air 14 on the one hand and gaseous fuel 20 on the other hand can be compressed.

The compressed gaseous fuel 20 and the compressed charge air 14 are mixed in a region of a cylinder head 19. Because of the fact that the second turbocharger 13, which serves for compressing the gaseous fuel 20, has a greater number of compressor stages than the first turbocharger 12, which serves for compressing the charge air 14, the gaseous fuel 20 is compressed to a higher pressure than the charge air 14. Because of this, a particularly advantageous, in particular regulated operation can be ensured for the gas engine 10.

Figure 2:
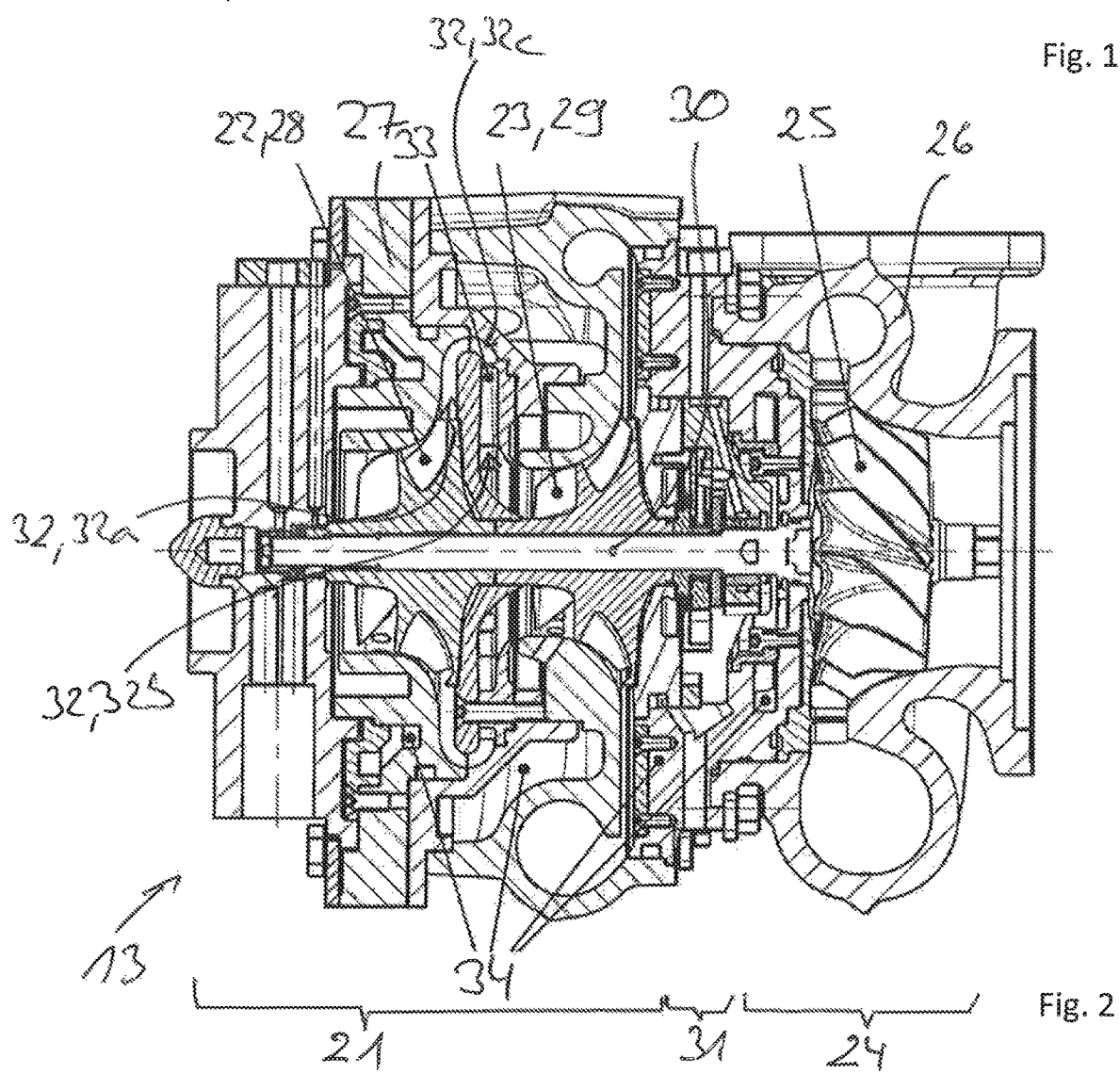
FIG. 2 is an axial sectional view through a turbocharger of the internal combustion engine of the present invention.

FIG. 2 shows a cross section through the second turbocharger 13, which serves for compressing the gaseous fuel. Accordingly, FIG. 2 shows the turbine 24 which comprises a turbine rotor 25 and a turbine housing 26.

The turbine 24 is preferentially embodied as a radial turbine which is preferentially subjected to an inflow of exhaust gas to be expanded in the radial direction, wherein expanded exhaust gas flows out of the turbine rotor 25 preferentially in the axial direction.

The compressor 21 comprises a compressor housing 27 with compressor housing sections 27*a*, 27*b* and a compressor rotor, which provides the two compressor stages 22, 23. Accordingly, the first compressor stage 22 comprises a first compressor rotor 28 and the compressor stage 23 a second compressor rotor 29 which are arranged on a common shaft 30. The turbine rotor 25 is coupled to the two compressor rotors 28, 29 via this shaft 30. The shaft 30 is mounted in a bearing housing 31, wherein the bearing housing 31 and the bearing 35 is connected on the one hand to the turbine housing 26 and on the other hand to the compressor housing 27, in particular to the compressor housing section 27*b*.

The two compressor stages 22, 23 of the compressor 21 of the turbocharger 13, which exclusively serves for compressing the gaseous fuel, both are designed as radial compressor stages, and the same are accordingly subjected to the inflow of gaseous fuel to be compressed in the axial direction, while the gaseous fuel flows out in the radial direction.

The gaseous fuel compressed in the region of the first compressor stage 22 can be fed via a flow passage 32 to the second compressor stage 23 for further compression.

This flow passage 32 comprises multiple passage sections 32*a*, 32*b* and 32*c*. A first passage section 32*a* extends in the radial direction and leads the gaseous fuel compressed in the region of the first compressor stage 22 away from the first compressor stage 22. The second passage section 32*b* likewise extends in the radial direction and conducts the gaseous fuel compressed in the region of the first compressor stage 22 in the region of the second compressor stage 23. Between these two passage sections 32*a*, 32*b* extending in the radial direction, a third, curved passage section 32*c* is formed, which deflects the compressed, gaseous fuel by approximately 180°.

In the second passage section 32*b* of the flow deflection in the region of the third passage section 32*c*, guide blades 33 are arranged. The guide blades 33 serve for optimally feeding the precompressed gaseous fuel in the direction of the second compressor stage 23.

In the housing 27 of the compressor 21 or in the compressor housing sections 27*a*, 27*b* and in the bearing housing 31, cooling channels 34 are introduced. The compressor 21 and the bearing housing 31 can be cooled via these cooling channels 34. Cooling of the gaseous fuel is also possible.

The cooling channels in the region of the bearing housing 31 bring about a thermal insulation from the hot turbine side. Because of this, a particularly advantageous operation of the turbocharger and of a gas engine comprising the turbocharger is possible.

The gas engine 10 is operated so that the gaseous fuel 20 is compressed independently of the charge air 14. Here, the gaseous fuel 20 is compressed to a higher pressure than the charge air 14.

These media compressed to different pressure levels, namely the gaseous fuel 20 and the charge air 14, are mixed in the region of the cylinder head 19 or before the cylinder head 19 in order to then feed the mixture of charge air 14 and gaseous fuel 20 to the cylinders 11.

Although the invention is described for a gas engine, the invention can also be employed with a dual-fuel engine.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A turbocharger system for an internal combustion engine, in particular a gas engine, with multiple cylinders constructed and arranged for combusting a mixture of charge air and a gaseous fuel, the turbocharger system comprising:
   a first turbocharger having only a single compressor stage, the first turbocharger being constructed and arranged to exclusively compress the charge air;
   a second turbocharger constructed and arranged to exclusively compress the gaseous fuel, the second turbocharger comprising:
      a compressor having: (a) a first compressor stage and a first compressor rotor, and (b) a second compressor stage and a second compressor rotor;
      a turbine with a turbine rotor, the turbine rotor, the first compressor rotor and the second compressor rotor are all coupled via a common shaft;
      a compressor housing including first cooling channels constructed and arranged for cooling the compressor stages of the compressor; and
      a bearing housing having second cooling channels disposed in the bearing housing at a turbine side of said bearing housing so as to thermally insulate from heat from the turbine side of the second turbocharger,
      wherein the first and second compressor stages of the second turbocharger are configured to compress the gaseous fuel in the second turbocharger to a pressure higher than a charge air pressure compressed by the single compressor stage of the first turbocharger.

2. The turbocharger system according to claim 1, wherein the first and second compressor stages of the compressor of the second turbocharger are radial compressor stages; and the turbine of the second turbocharger is a radial turbine.

3. The turbocharger system according to claim 1, additionally comprising a curved flow passage with a first passage section leading away from the first compressor stage in the radial direction; a second passage section leading to the second compressor stage in the radial direction and a third curved passage section running between the first and second passage section and guide blades arranged in the second passage section leading to the second compressor stage in the radial direction.

4. A method of operating an internal combustion engine, in particular a gas engine with multiple cylinders wherein in the cylinders a mixture of charge air and a gaseous fuel can be combusted and wherein the internal combustion engine includes the turbocharger system according to claim 1, the method comprising:

compressing the charge air in the first turbocharger to a predetermined pressure; and compressing the gaseous fuel in the second turbocharger to a pressure higher than predetermined pressure of the charge air.

5. The method according to claim 4, additionally comprising the step of mixing the compressed charge air and the independently compressed gaseous fuel in a cylinder head or before the cylinder head.

6. The turbocharger system according to claim 2, additionally comprising a curved flow passage with a first passage section leading away from the first compressor stage in the radial direction; a second passage section leading to the second compressor stage in the radial direction and a third curved passage section running between the first and second passage sections; and guide blades arranged in the second passage section leading to the second compressor stage in the radial direction.

* * * * *